US008376651B2

(12) United States Patent
Kulp et al.

(10) Patent No.: US 8,376,651 B2
(45) Date of Patent: Feb. 19, 2013

(54) WATER-BALLASTED PROTECTION BARRIERS AND METHODS

(75) Inventors: Jack H. Kulp, Dana Point, CA (US); Felipe Almanza, Perris, CA (US); Geoffrey B. Maus, Mission Viejo, CA (US); Paul Burlingham, Chino, CA (US)

(73) Assignee: Traffix Devices, Inc., San Clemente, CA (US)

( * ) Notice: Subject to any disclaimer, the term of this patent is extended or adjusted under 35 U.S.C. 154(b) by 0 days.

(21) Appl. No.: 13/093,555

(22) Filed: Apr. 25, 2011

(65) Prior Publication Data

US 2011/0262225 A1 Oct. 27, 2011

Related U.S. Application Data

(63) Continuation of application No. 12/699,770, filed on Feb. 3, 2010, which is a continuation-in-part of application No. 12/179,451, filed on Jul. 24, 2008, now Pat. No. 7,931,422, which is a continuation-in-part of application No. 11/233,387, filed on Sep. 21, 2005.

(51) Int. Cl.
*E01F 13/02* (2006.01)

(52) U.S. Cl. ................................ 404/6; 404/9; 256/13.1

(58) Field of Classification Search .................. 404/6, 9, 404/10; 256/13.1, 1; D25/38, 113
See application file for complete search history.

(56) References Cited

U.S. PATENT DOCUMENTS 2,308,965 A * 1/1943 Riesing ........................ 384/220
4,500,225 A 2/1985 Quittner
4,681,302 A 7/1987 Thompson
4,869,617 A 9/1989 Chiodo
5,425,594 A 6/1995 Krage et al.
5,498,101 A 3/1996 Braverman
5,605,413 A 2/1997 Brown
D400,264 S 10/1998 Striefel et al.
5,882,140 A 3/1999 Yodock, Jr. et al.
5,988,934 A 11/1999 Wasserstrom
6,059,491 A 5/2000 Striefel et al.
D431,657 S 10/2000 Wasserstrom
6,203,242 B1 3/2001 Englund
6,413,009 B1 7/2002 Duckett
D462,126 S 8/2002 Englund
6,474,904 B1 11/2002 Duckett et al.
6,666,616 B2 12/2003 Yodock, III et al.
6,669,402 B1 12/2003 Davis et al.
6,863,468 B2 3/2005 Davis et al.
7,220,077 B2 5/2007 Humphries et al.
2004/0057792 A1 3/2004 Yodock, III et al.
2004/0096273 A1 5/2004 Yodock, III et al.
2008/0118305 A1 5/2008 Carey

* cited by examiner

*Primary Examiner* — Robert Pezzuto
*Assistant Examiner* — Matthew D Troutman
(74) *Attorney, Agent, or Firm* — Stout, Uxa, Buyan & Mullins, LLP; Donald E. Stout

(57) ABSTRACT

A water-ballasted molded plastic barrier system incorporates barrier segments wherein each segment employs a sawtooth reflective design, designed to prevent the tire of a vehicle, impacting the barrier, from climbing up the side of the barrier segment. Adjacent barrier segments are attached together using an interlocking knuckle design, having a lug pin connection system. Wire rope cable assemblies are internally molded into each barrier segment to create an impenetrable cable fence. The wire rope cable assemblies include steel bushings which are molded into the interlocking knuckles to further strengthen the barrier system.

16 Claims, 11 Drawing Sheets

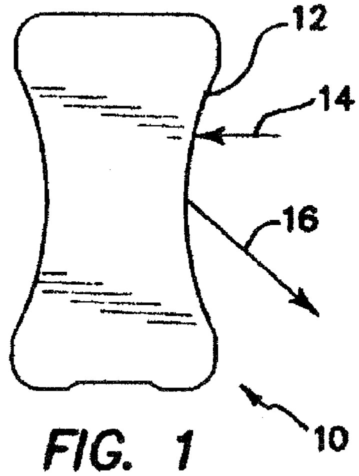
FIG. 1
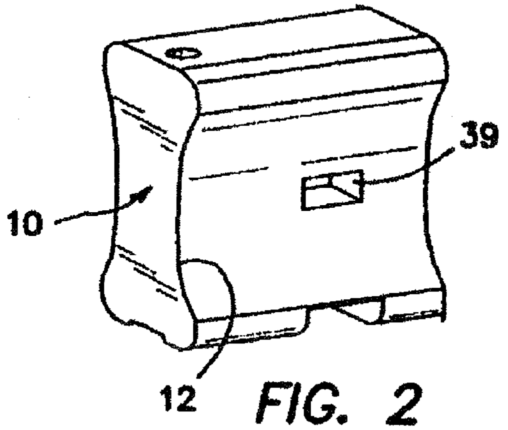
FIG. 2
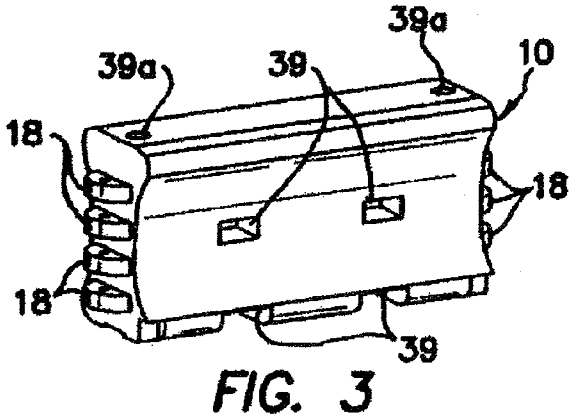
FIG. 3
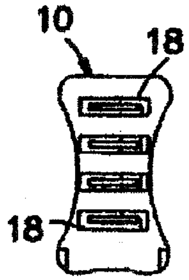
FIG. 5
FIG. 4
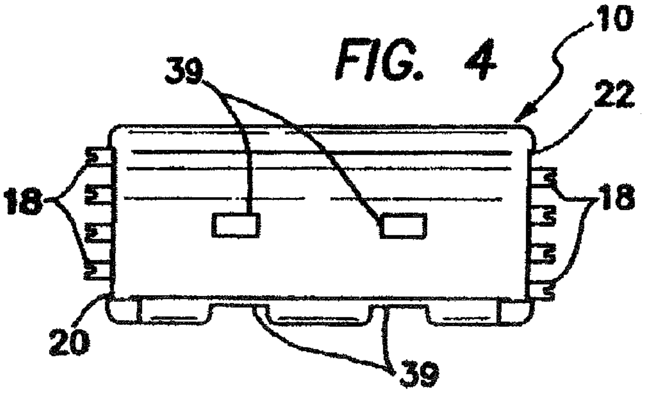
FIG. 6
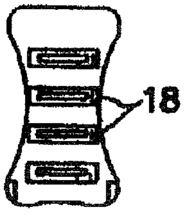

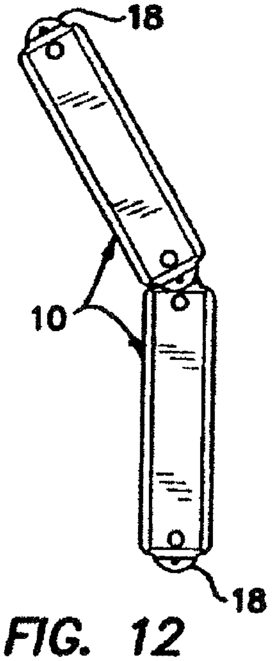
FIG. 12
FIG. 13
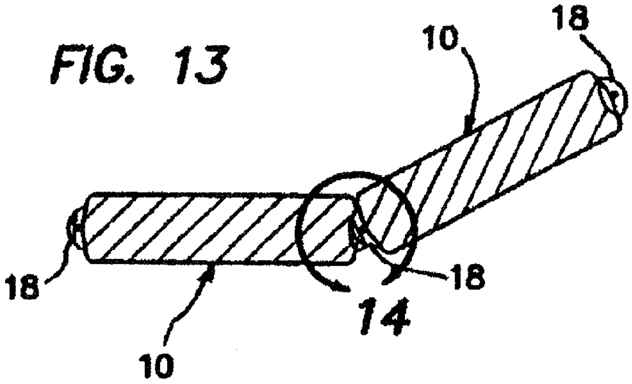
FIG. 14
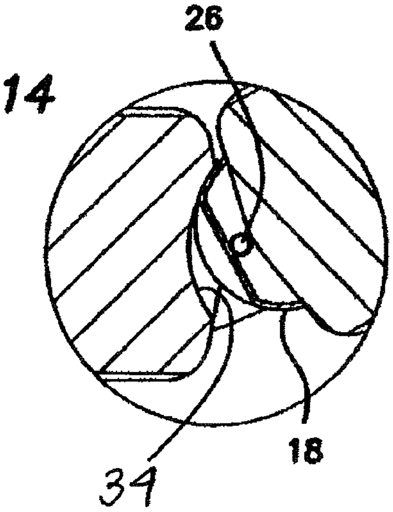
FIG. 15
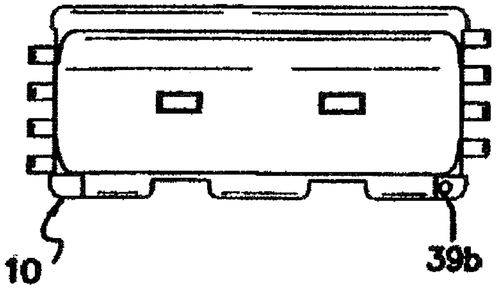
FIG. 16
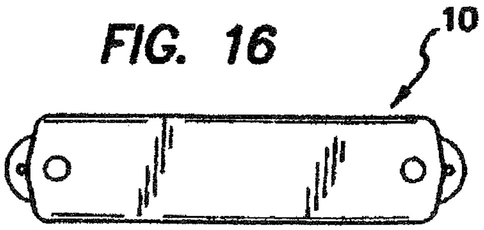
FIG. 17
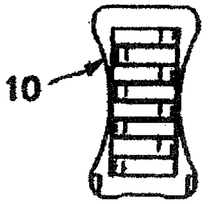

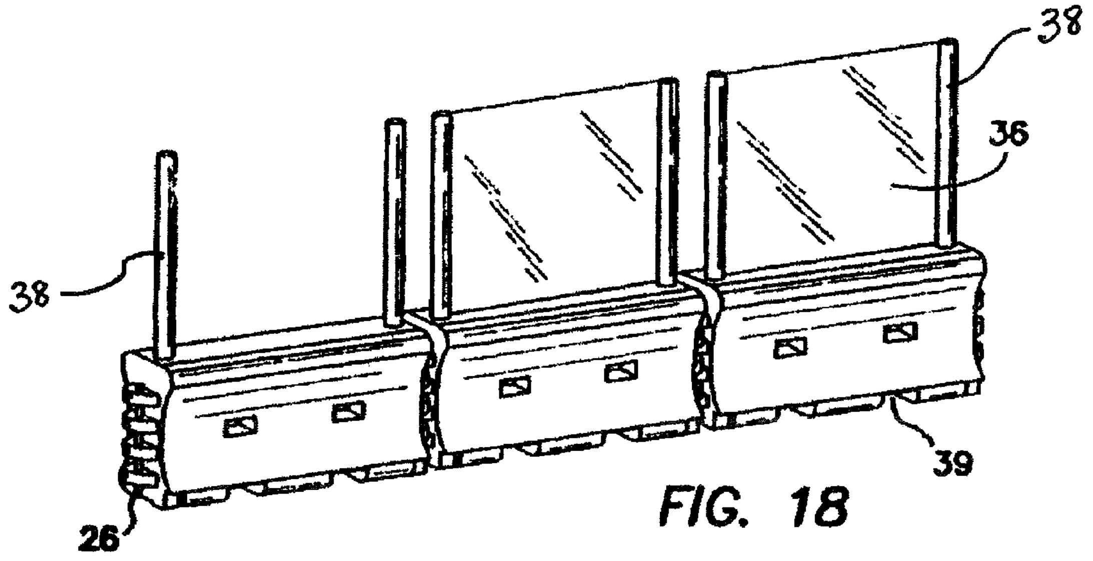
FIG. 18
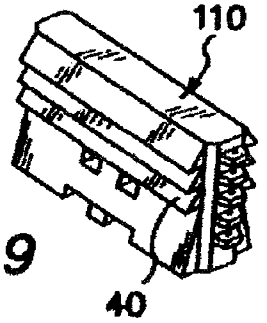
FIG. 19
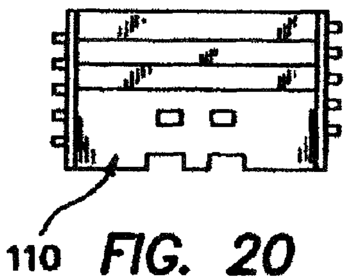
FIG. 20
FIG. 21
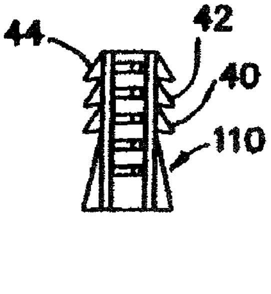
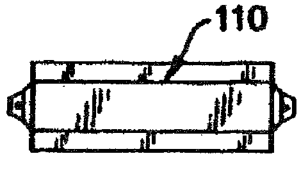
FIG. 22

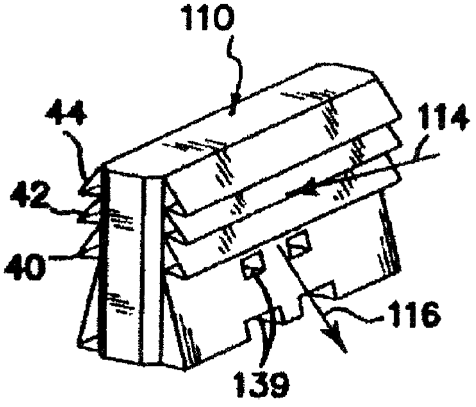
FIG. 23
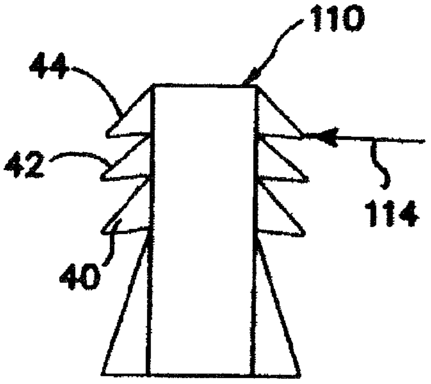
FIG. 24
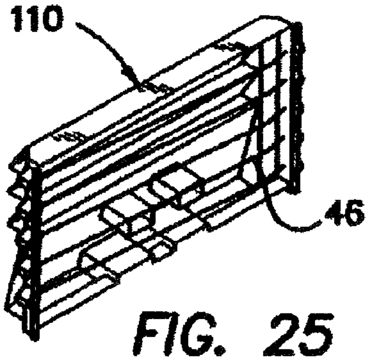
FIG. 25
FIG. 27
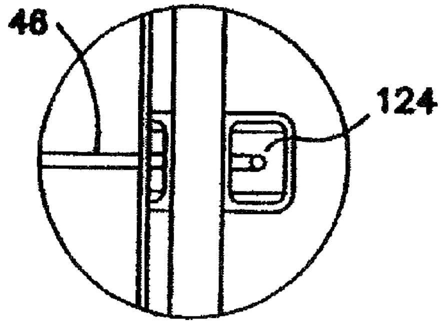
FIG. 26
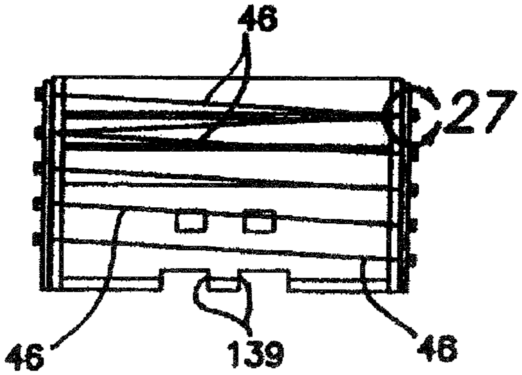

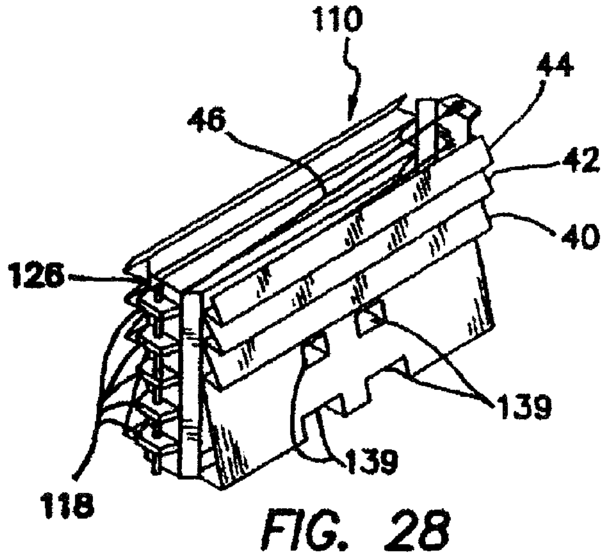
FIG. 28
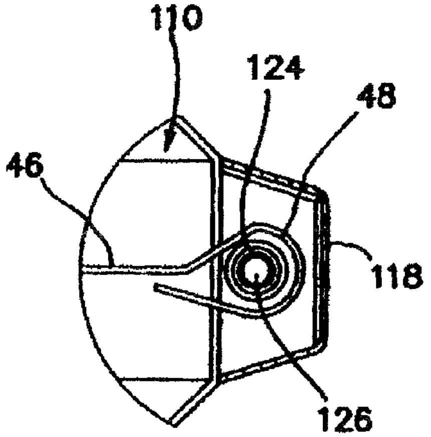
FIG. 30
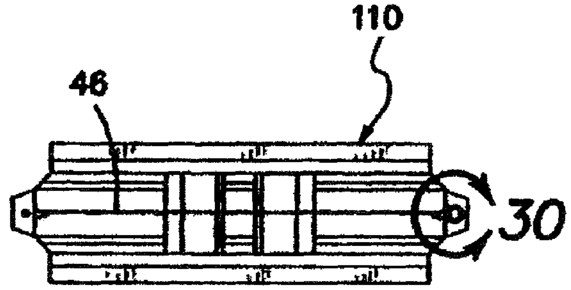
FIG. 29
FIG. 31
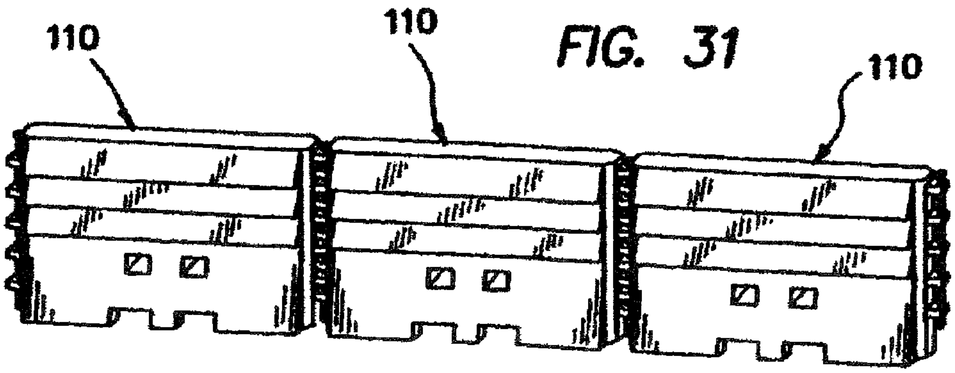

FIG. 35
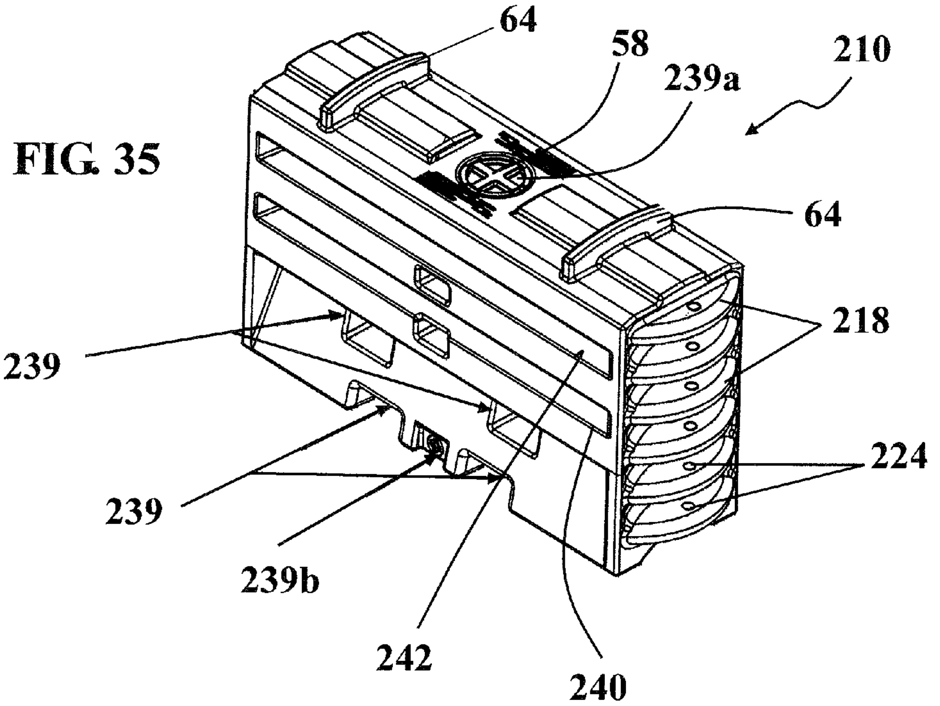
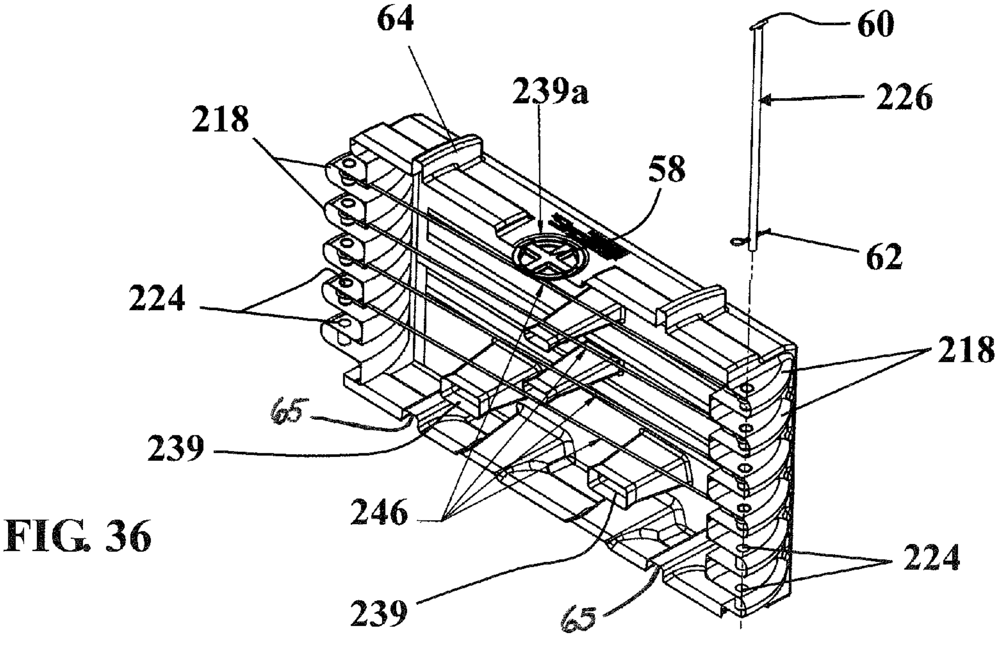
FIG. 36

WATER-BALLASTED PROTECTION BARRIERS AND METHODS

This application is a continuation application under 35 U.S.C. 120 of commonly assigned U.S. patent application Ser. No. 12/699,770, entitled Water-Ballasted Protection Barriers and Methods, filed on Feb. 3, 2010, which in turn, claims the benefit under 35 U.S.C. 119(e) of the filing date of Provisional U.S. Application Ser. No. 61/149,524, entitled Water-Ballasted Protection Barriers and filed on Feb. 3, 2009. This application is also a continuation-in-part under 35 U.S.C. 120 of U.S. application Ser. No. 12/179,451, entitled Water-Ballasted Protection Barrier, filed on Jul. 24, 2008, and now U.S. Pat. No. 7,931,422, which, in turn, is a continuation-in-part of prior U.S. patent application Ser. No. 11/233,387, entitled Water-Ballasted Protection Barrier, filed on Sep. 21, 2005, and presently pending. The '451 application also claims the benefit under 35 U.S.C. 119(e) of the filing date of Provisional U.S. Application Ser. No. 60/961,775, entitled Water-Ballasted Protection Barrier, and filed on Jul. 24, 2007. All of the above referenced applications are commonly assigned herewith and herein expressly incorporated by reference, in their entirety.

BACKGROUND OF THE INVENTION

The present invention relates generally to vehicle protection barriers, and more particularly to movable water ballasted vehicle traffic protection barriers for applications such as pedestrian protection, traffic work zone separation, airport runway divisions, and industrial commercial uses.

Water ballasted vehicle traffic protection barriers of the type described herein are known in the prior art. Generally, such barriers are comprised of molded, lightweight plastic, and are hollow, having a fill port for filling them with water to ballast them in place. The barriers are fabricated to be sectional and modular, so that, once placed in a desired location, they can be attached together lengthwise to create a barrier of any desired length.

Prior art water ballasted barriers of this type have a certain utility, but have been plagued with durability problems, and have difficulty meeting current federal highway safety standards, specifically the Federal Highway Administration Standards of Report NCHRP 350. Failure of a barrier to meet these standards excludes the barrier from use on any highway project which is funded in whole or in part by federal highway funds, and thus severely limits that barrier's usefulness. Typically, failures occur because the barrier cannot pass vehicle impact tests required under NCHRP 350 standards. Test level 1 (TL-1) standards requires an 820 kg vehicle to impact the water wall barrier at 50 kilometers per hour (kph) at an impact angle of 20 degrees, and a 2000 kg vehicle to impact the water wall barrier at 50 kph at an impact angle of 25 degrees. Test level 2 (TL-2) standards require an impact velocity of 70 kph, with the same vehicle weights and impact angles as for TL-1 tests. Test level 3 (TL-3) standards require an impact velocity of 100 kph, again with the same vehicle weights and impact angles as for TL-1 and TL-2 tests. To pass these impact tests, the barrier must keep the impact vehicle from penetrating and driving over the water wall, as well as keeping the impact vehicle from rolling over on its side or roof. Additionally, occupant velocity must not exceed 12 m/s, and the ride-down acceleration must not exceed 20 g.

What is needed, therefore, is an improved water ballasted protection barrier system which can successfully meet the TL-1, TL-2, and TL-3 test standards described above.

SUMMARY OF THE INVENTION

Accordingly, there are disclosed herein two embodiments of a water ballasted protection barrier system which are together capable of meeting all three test standards discussed above.

More particularly, there is provided a barrier segment which is hollow and adapted to be filled with a fluent material for ballast. The barrier segment comprises a molded plastic container having outer walls defining an interior volume and having a first end and a second end. A plurality of connecting lugs are disposed on each of the first and second ends, so that a plurality of barrier segments may be joined together. A length of metallic cable, preferably stainless steel wire rope cable or galvanized steel and stranded wire for corrosion resistance, comprising a plurality of ⅜ inch 7×19 strands, is molded within the molded plastic container, so that most of the length of metallic cable is entirely disposed within the interior volume of the container, along substantially an entire length of the container between the first and second ends thereof.

Preferably, a loop of cable is disposed at each end of the length of cable, wherein each of the loops are wrapped about a pin hole disposed in one of the lugs. The length of metallic cable is connected between opposing lugs on the first and second ends of the container. In preferred embodiments, additional lengths of metallic cable are provided, wherein there is a length of metallic cable connected between each pair of opposing lugs on the first and second ends of the container.

A hole is molded into in each of the connecting lugs, for receiving a connecting pin. In some applications, the inventive barrier includes a fence post adapted for disposition over a top end of a connecting pin, for supporting a fence above the barrier segment.

An important feature of the invention is the inclusion of a drain aperture in one of the outer walls of the barrier segment. A closure is provided for closing and sealing the drain aperture. Advantageously, the drain aperture comprises buttress threads disposed on an interior surface of the drain aperture. Threads are disposed on an outer surface of the closure, for engaging the buttress threads to secure the closure sealingly relative to the drain aperture. The buttress threads are coarse and square cut, with flat edges.

Another advantageous feature of the invention is the provision of a recess disposed on the barrier segment outer wall, surrounding the drain aperture, having a depth sufficient so that when the closure is engaged with the drain aperture to close same, an outer surface of the closure is approximately flush with adjacent non-recessed portions of the outer wall.

In another aspect of the invention, there is provided a barrier segment which is hollow and adapted to be filled with a fluent material for ballast. The barrier segment comprises a molded plastic container having outer walls defining an interior volume and having a first end and a second end. The outer walls have a plurality of sawtooth segments disposed thereon, which are arranged vertically and extend outwardly and downwardly in order to deflect vehicles impacting the barrier segment in a downward direction. Preferably, there are three sawtooth segments disposed on each lengthwise outer wall.

A length of metallic cable is preferably molded within the molded plastic container, so that most of the length of metallic cable is entirely disposed within the interior volume, along substantially an entire length of the container between the first and second ends.

In still another aspect of the invention, there is provided a barrier segment which is hollow and adapted to be filled with a fluent material for ballast. The barrier segment comprises a molded plastic container having outer walls defining an interior volume and having a first end and a second end. A plurality of connecting lugs are disposed on each of the first and second ends, so that a plurality of barrier segments may be joined together. Each of the connecting lugs comprises a hole for receiving a connecting pin therethrough, and a double-walled reinforcing portion adjacent to the hole on the lug. A recessed section is disposed on an outside of each lug, which creates the double-walled reinforcing portion. A concave female portion on each end of the barrier segment, adjacent to said lugs, provides beneficial effects when a barrier formed by multiple barrier segments, joined end-to-end, is impacted by a vehicle, as described more fully hereinbelow.

Preferably, each lengthwise outer wall is formed in a vertically oriented concave curved shape. A concave center portion of each lengthwise outer wall has a curve radius of 24¾ inches.

In preferred embodiments, a length of metallic cable is molded within the molded plastic container, so that most of the length of metallic cable is entirely disposed within the interior volume, along substantially an entire length of said container between the first and second ends.

In yet another aspect of the invention, there is disclosed a method of making a barrier segment for use in creating a roadside barrier system. This method comprises steps of disposing at least one wire rope cable within a mold tool, and using the mold tool to mold a plastic hollow container. When the molding step is completed, the wire rope cable is irremovably disposed within the plastic hollow container. The disposing step preferably comprises disposing a plurality of wire rope cables within the mold tool.

In still another aspect of the invention, there is provided a barrier segment which is hollow and adapted to be filled with a fluent material for ballast. The barrier segment comprises a molded plastic container having outer walls defining an interior volume and having a first end and a second end. A plurality of connecting lugs are disposed on each of the first and second ends, so that a plurality of barrier segments may be joined together. A drain aperture is disposed in one of the outer walls of the barrier segment, and a closure is provided for closing and sealing the drain aperture. Advantageously, buttress threads are disposed on an interior surface of the drain aperture. Threads are disposed on an outer surface of the closure, for engaging the buttress threads to secure the closure sealingly relative to the drain aperture. The buttress threads are coarse and square cut, with flat edges. Another advantageous feature of the invention is that a recess is disposed on the barrier segment outer wall, surrounding the drain aperture, having a depth sufficient so that when the closure is engaged with the drain aperture to close same, an outer surface of the closure is approximately flush with adjacent non-recessed portions of the outer wall.

In another aspect of the invention, there is provided a barrier segment which is hollow and adapted to be filled with a fluent material for ballast. The barrier segment comprises a molded plastic container having outer walls defining an interior volume and having a first end and a second end, and a plurality of connecting lugs disposed on each of the first and second ends, so that a plurality of barrier segments may be joined together. A length of metallic cable, preferably comprising wire rope cable formed of a plurality of strands of galvanized steel, is molded within the molded plastic container, so that most of the length of metallic cable is entirely disposed within the interior volume, along substantially an entire length of the container between the first and second ends. A bushing is advantageously molded into one of the connecting lugs on the first end of the barrier segment to form a channel through which a pin can be extended to secure the lug to another lug, wherein an end of said metallic cable is attached to the bushing. A second end of the length of metallic cable is connected to a second bushing molded into a corresponding connecting lug disposed on the second end of the barrier segment.

Preferably, additional lengths of metallic cable are disposed in the barrier segment, wherein there is a length of metallic cable connected between each pair of opposing lugs on the first and second ends of the container. There is a bushing disposed in each connecting lug of the barrier segment.

The end of cable is wrapped about a periphery of the bushing and connected to the cable to form a loop of cable securing the cable to the bushing. It is preferably swaged or clamped to the remaining cable to secure the loop of cable in place about the bushing. The bushing further comprises, in a preferred embodiment, an enlarged step at each end thereof. The bushing is encased in molded plastic, wherein the molded plastic encasing the bushing is thicker around each of the enlarged steps than around remaining portions of the bushing. The metallic cable is encased in molded plastic.

The outer walls of the inventive barrier segment preferably has a plurality of sawtooth segments disposed thereon, which are arranged in spaced relation vertically and extend inwardly and upwardly in order to deflect vehicles impacting the barrier segment in a downward direction.

The inventive barrier segment preferably comprises a plurality of stacking lugs disposed in spaced relation on a top surface of the barrier segment, and a corresponding plurality of stacking recesses disposed in spaced relation on a bottom surface of the barrier segment, wherein when two of the barrier segments are stacked vertically, the stacking lugs on the bottom barrier segment engage with the corresponding stacking recesses on the top barrier segment.

In yet another aspect of the invention, there is provided a barrier segment which is hollow and adapted to be filled with a fluent material for ballast. This barrier segment comprises a molded plastic container having outer walls defining an interior volume and having a first end and a second end. The outer walls have a plurality of sawtooth segments disposed thereon, which are arranged in vertically spaced relation and extend inwardly and upwardly in order to deflect vehicles impacting the barrier segment in a downward direction. In a preferred configuration, there are two sawtooth segments disposed on each lengthwise outer wall. A length of metallic cable is molded within the molded plastic container, so that most of the length of metallic cable is entirely disposed within the interior volume, along substantially an entire length of the container between the first and second ends.

In still another aspect of the invention, there is provided a wire rope cable assembly for use in a molded plastic hollow barrier segment, which comprises a length of metallic cable having opposed ends, a first bushing connected to a first one of the opposed ends, and a second bushing connected to a second one of the opposed ends. The cable at the first opposed end comprises a first loop wrapped about a periphery of the first bushing and connected to itself to secure the loop, and the cable at the second opposed end comprises a second loop wrapped about a periphery of the second bushing and connected to itself. On each of the opposed ends of the cable, the cable end is swaged or clamped to the remaining cable to secure the loop of cable in place about the corresponding bushing. Advantageously, each of the first and second bushings further comprises an enlarged step at each end thereof.

In another aspect of the invention, there is disclosed a method of making a barrier segment for use in creating a roadside barrier system, which comprises a step of disposing at least one wire rope cable, which is connected on an end thereof to a bushing, within a mold tool, and using the mold tool to mold a plastic hollow container. As a result, when the molding step is completed, the wire rope cable and bushing are irremovably disposed within the plastic hollow container. The swaging step preferably further comprises a step of swaging the end of the wire rope cable to the bushing, thereby forming a cable loop around a periphery thereof. Additionally, the method includes another step of swaging an opposed end of the wire rope cable to a second bushing, thereby connecting the second end to the second bushing and forming a second cable loop around a periphery thereof. The disposing step further comprises a step of stretching the wire rope cable and attached bushings across the mold, so that the cable is relatively taut.

Preferably, the disposing step also comprises disposing a plurality of wire rope cables and connected bushings within the mold tool. The using step comprises rotationally molding the barrier segment. As a result, the molding step encapsulates the wire rope cable and bushing assemblies in plastic.

The invention, together with additional features and advantages thereof, may best be understood by reference to the following description taken in conjunction with the accompanying illustrative drawing.

BRIEF DESCRIPTION OF THE DRAWINGS

FIG. 1 is an end elevation view showing a configuration of a water barrier segment constructed in accordance with one embodiment of the present invention;

FIG. 2 is a perspective view of a portion of the barrier segment of FIG. 1;

FIG. 3 is a perspective view of the barrier segment of FIGS. 1 and 2;

FIG. 4 is a front elevation view of the barrier segment of FIG. 3;

FIG. 5 is a left end elevation view of the barrier segment of FIGS. 1-4;

FIG. 6 is a right end elevation view of the barrier segment of FIGS. 1-4

FIG. 12 is a plan view from the top showing two connected barrier segments rotating with respect to one another upon vehicular impact;

FIG. 13 is a cross-sectional plan view taken along lines A-A of FIG. 8, after vehicular impact and relative rotation of the two barrier segments;

FIG. 14 is a cross-sectional plan view of the detail section C of FIG. 13;

FIG. 15 is an elevation view of a barrier segment of the type shown in FIG. 7, showing some of the constructional details of the segment;

FIG. 16 is a top plan view of the barrier segment of FIG. 15;

FIG. 17 is an end elevation view of the barrier segment of FIG. 15;

FIG. 18 is a perspective view showing three barrier segments secured together;

FIG. 19 is a perspective view of a second, presently preferred embodiment of a barrier segment constructed in accordance with the principles of the present invention;

FIG. 20 is a front elevation view of the barrier segment shown in FIG. 19;

FIG. 21 is an end elevation view of the barrier segment shown in FIGS. 19-20;

FIG. 22 is a top plan view of the barrier segment shown in FIGS. 19-21;

FIG. 23 is a perspective view of the barrier segment shown in FIGS. 19-22, taken from an opposing orientation;

FIG. 24 is an end elevation view of the barrier segment of FIG. 23;

FIG. 25 is a sectioned perspective view of the barrier segment of FIG. 23, showing internal constructional features of the barrier segment, and in particular a unique cable reinforcement system;

FIG. 26 is a front sectioned view of the barrier segment of FIG. 25;

FIG. 27 is a sectioned detail view of the portion of FIG. 26 identified as detail A;

FIG. 28 is a perspective view of the barrier segment of FIGS. 19-27;

FIG. 29 is a top plan view of the barrier segment of FIG. 28;

FIG. 30 is a sectioned detail view of the portion of FIG. 29 identified as detail A;

FIG. 31 is a perspective view showing three barrier segments secured together;

FIG. 35 is an isometric view of another modified embodiment of a fluid-ballasted barrier segment constructed in accordance with the present invention;

FIG. 36 is a cross-sectional isometric view taken along lines A-A of FIG. 35, illustrating certain interior features of the barrier segment of FIG. 35;

DESCRIPTION OF THE PREFERRED EMBODIMENT

Figure 7:
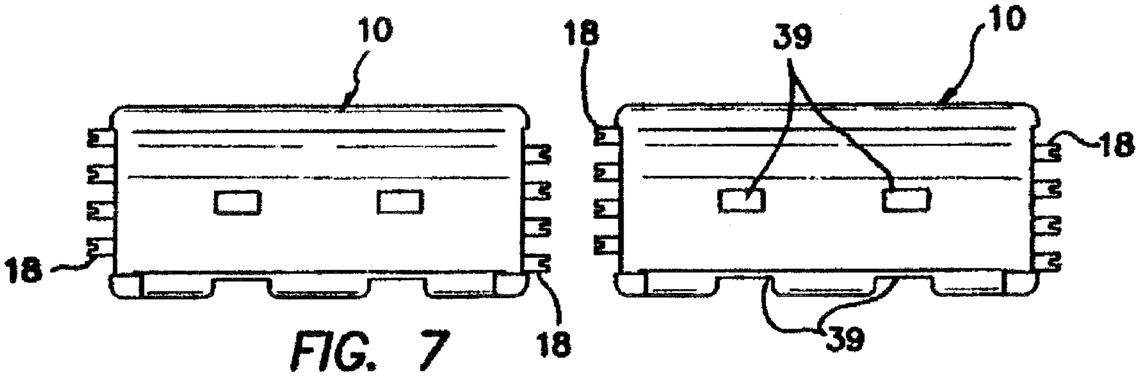
FIG. 7 is a front elevation view showing two barrier segment such as that shown in FIG. 4, wherein the segments are detached.

Referring now more particularly to the drawings, there is shown in FIGS. 1-3 and 15-17 a water-ballasted barrier segment 10 constructed in accordance with one embodiment of the present invention. The illustrated barrier segment preferably has dimensions of approximately 18 in. W×32 in. H×78 in. L, with a material thickness of about ¼ in. The material used to fabricate the segment 10 may be a linear medium density polyethylene, and is preferably rotationally molded, although it may also be molded using other methods, such as blow molding. The segment 10 preferably has an empty weight of approximately 75-80 lb., and a filled weight (when filled with water ballast) of approximately 1100 lb.

Particularly with respect to FIGS. 1-2, the barrier segment 10 has been constructed using a unique concave redirective design, wherein outer walls 12 of the barrier segment 10 are configured in a concave manner, as shown. In a preferred configuration, the concave section is approximately 71 inches long, and runs the entire length of the barrier segment. The concave section is designed to prevent the tire of a vehicle, impacting the barrier along the direction of arrow 14, from climbing up the side of the barrier segment, by pocketing the tire in the curved center portion of the barrier wall 12. When the vehicle tire is captured and pocketed inside the curved portion, the reaction force of the impact then diverges the vehicle in a downward direction, as shown by arrow 16 in FIG. 1. The concave diverging design will thus assist in forcing the vehicle back toward the ground rather than up the side of the water barrier segment 10. In a preferred configuration, as shown in FIG. 1, the concave center portion of the outer wall 12 has a curve radius of approximately 24¾ in., and is about 23 inches in height.

FIGS. 3-11 illustrate an interlocking knuckle design for securing adjacent barrier segments 10 together. The interlocking knuckle design is a lug pin connection system, comprising four lugs 18 disposed in interweaved fashion on each end of the barrier segment 10. Each lug 18 is preferably about 8 inches in diameter, and approximately 2 inches thick, although various dimensions would be suitable for the inventive purpose. To achieve the interweaved effect, on a first end 20 of the barrier segment 10, the first lug 18 is disposed 4 inches from the top of the segment 10. The remaining three lugs 18 are equally spaced vertically approximately 3½ inches apart. On a second end 22 of the barrier segment 10, the first lug 18 is disposed about 7 inches from the top of the barrier segment 10, with the remaining three lugs 18 being again equally spaced vertically approximately 3½ inches apart. These dimensions are preferred, but again, may be varied within the scope of the present invention.

Figure 8:
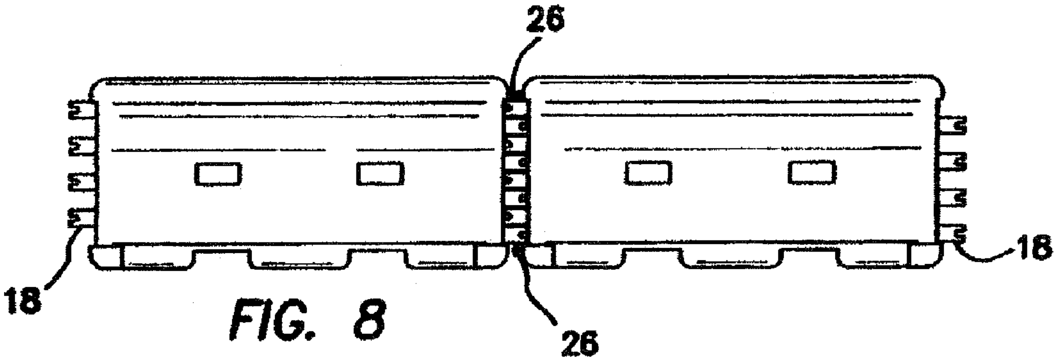
FIG. 8 is a front elevation view similar to FIG. 7, showing the barrier segments after they have been attached to one another.
Figure 10:
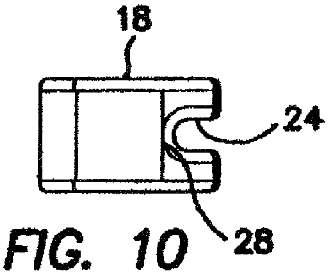
FIG. 10 is a cross-sectional view showing a double wall reinforcement area for a pin lug on the barrier segment.

When the ends of two adjacent barrier segments 10 are placed together, as shown sequentially in FIGS. 7 and 8, the complementary lugs 18 on the mating ends of the adjoined segments 10 slide between one another in interweaved fashion, due to the offset distance of each lug location, as described above, and shown in FIGS. 4 and 7. The lugs' dimensional offset permit each segment 10 to be linked together with one lug atop an adjacent lug. This results in a total of eight lugs on each end of the water barrier segment 10 that lock together, as see in FIG. 8. Each lug 18 has a pin receiving hole 24 disposed therein, as best shown in FIG. 10. When the eight lugs 18 are engaged, as discussed above, upon the adjoining of two adjacent barrier segments 10, these pin receiving holes 24, which are preferably approximately 1½ inches in diameter, and are disposed through the two inch thick portion of the lug 18, correspond to one another. Thus, a T-pin 26 is slid vertically downwardly through the corresponding pin receiving holes 24 of all eight lugs or knuckles 18, as shown in FIG. 8, in order to lock the two adjoined barrier segments 10 together.

Figure 9:
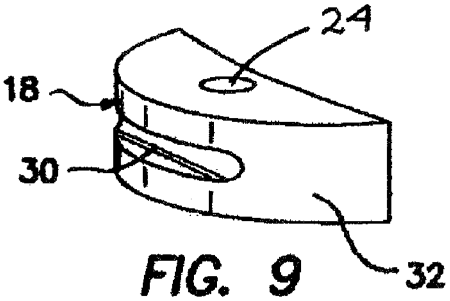
FIG. 9 is a perspective view, in isolation, of an interlocking knuckle for use in attaching two barrier segments together.
Figure 11:
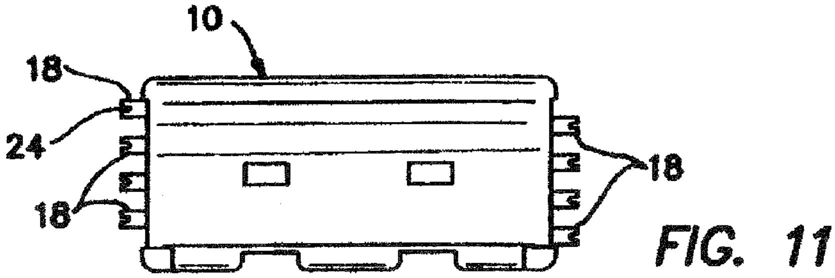
FIG. 11 is a front elevation view similar to FIG. 7 showing a barrier segment.

To reduce the bearing load on the pin lug connection, a double wall reinforcement 28 is included on the backside of the hole 24 on the lug 18, as shown in FIG. 10. The double reinforced wall is created by molding an indentation 30 on an outer curved section 32 of the lug 18, as shown in FIG. 9. The removal of material on the outside curved section 32 of the lug 18 creates a double reinforced wall on the inside section of the lug. The wall created by the recessed section 30 on the outside of the lug creates a reinforcement section 28 against the vertical hole 24 in the lug 18, as shown in sectioned FIG. 10. By creating this double wall reinforcement section 28, the T-pin 26 has two approximately ¼ inch thick surfaces to transfer the load to the T-pin 26 during vehicular impact. This arrangement will distribute the bearing load over a larger area, with thicker material and more strength.

During impact, the water barrier can rotate at the pin lug connection, resulting in large stresses at the pin lug connection during maximum rotation of the water wall upon impact. To reduce the stresses at the pin lug connection, a concave inward stress transfer zone is formed between the male protruding lugs 18, as shown in FIGS. 12-14. The concave inward section creates a concave female portion 34 at the ends of each water wall segment where the male end of each lug 18 will slide inside when aligned, as illustrated. Before vehicular impact, the male lugs 18 are not in contact with any surface inside the concave female portion 34 of the barrier segment 10. However, when the segment 10 is impacted, and is displaced through its full range of rotation (approximately 30 degrees), as shown in the figures, the external curved surface of the male lugs will come into contact with the external surface of the inside wall of the concave female portion, as shown in FIG. 14. This transfers the load from the pin lug connection to the lug contact point of the male/female portion. By transferring the load of the vehicular impact from the pin lug connection to the female/male contact point, the load is distributed into the male/female surface contact point before the pin connection begins to absorb the load. This significantly reduces the load on the T-pin 26, preventing the pin itself from bending and deforming during the impact.

To accommodate the ability to dispose a fence 36 or any other type of device to block the view on ones side of the barrier 10, the t-pins 26 are designed to support a square or round tubular fence post 38, as shown in FIG. 18. The tubular post 38 is adapted to slip over the t-pin, with suitable retaining structure disposed to ensure that the post 38 is firmly retained thereon.

In a preferred method, each barrier segment 10 is placed at a desired location while empty, and relatively light. This placement may be accomplished using a forklift, for example, utilizing forklift apertures 39. Once the segments are in place, and connected as described above, they can then be filled with water, using fill apertures **39*a* as shown in FIG. 3. When it is desired to drain a barrier segment, drain apertures, such as aperture 39*b* in FIG. 15**, may be utilized.

Now referring in particular to FIGS. 19-21, a second embodiment of a water-ballasted barrier segment 110 is illustrated, wherein like elements are designated by like reference numerals, preceded by the numeral 1. This barrier segment 110 is preferably constructed to have overall dimensions of approximately 24 in. W×42 in. H×78 in. L, with a material thickness of about ¼ inches. As in the prior embodiment, these dimensions are presently preferred, but not required, and may be varied in accordance with ordinary design considerations. The material of which the barrier segment 110 is fabricated is preferably a high density polyethylene, and the preferred manufacturing process is rotational molding, although other known processes, such as blow molding, may be used.

The illustrated embodiment utilizes a unique configuration to ensure that an impacting vehicle will be prevented from driving up and over the segment 110 upon impact. This configuration comprises a saw tooth profile, as illustrated, which is designed into the top portion of the barrier segment 110, as shown in FIGS. 19-24. The design intent of the saw tooth profile is to snag the bumper, wheel, or any portion of a vehicle impacting the barrier 110 from a direction indicated by arrow 114 (FIG. 23) and to deflect the vehicle in a downward direction as indicated by arrow 116 (FIG. 23). The saw tooth profile shape runs the entire length of each section of the barrier segment 110, as shown. A first protruding segment or sawtooth 40, forming the sawtooth profile, begins to protrude approximately 20 inches above the ground, and second and third protruding segments 42, 44, respectively are disposed above the segment 40, as shown. Of course, more or fewer sawtooth segments, or climbing ribs, may be utilized, depending upon particular design considerations. The design intent of using a plurality of sawtooth segments is that, if the first climbing rib 40 does not succeed in containing the vehicle and re-directing it downwardly to the ground, the second or third climbing ribs 42, 44, respectively, should contain the vehicle before it can successfully climb over the barrier 110.

The first embodiment of the invention, illustrated in FIGS. 1-18, is capable of meeting the earlier described TL-1 crash test, but plastic construction alone has been found to be insufficient for withstanding the impact of a vehicle traveling 70 kph or 100 kph, respectively, as required under TL-2 and TL-3 testing regimes. The plastic does not have sufficient physical properties alone to stay together, pocket, or re-direct an impacting vehicle at this velocity. In order to absorb the energy of a vehicle traveling at 70 to 100 kph, the inventors have found that steel components need to be incorporated into the water barrier system design. Using steel combined with a large volume of water for ballast and energy absorption enables the properly designed plastic wall to absorb the necessary energy to meet the federal TL-2 and TL-3 test requirements at such an impact.

To contain the 70 to 100 kph impacting vehicle, the inventors have used the interlocking plastic knuckle design described earlier in connection with the TL-1 water barrier system described and shown in FIGS. 1-18 of this application. The same type of design principles are used in connection with this larger and heavier TL-2 and TL-3 water barrier system, which includes the same interlocking knuckle attachment system disclosed in connection with the first embodiment.

The TL-2 and TL-3 barrier system described herein in connection with FIGS. 19-31 absorbs energy by plastic deformation, water displacement, wire rope cable fencing tensioning, water dissipation, and overall displacement of the water barrier itself. Since it is known that plastic alone cannot withstand the stringent test requirements of the 70-100 kph TL-2 and TL-3 vehicular impact protocols, internally molded into the barrier segment 110 is a wire rope cable 46, which is used to create a submerged fence inside the water barrier segment 110 as shown in FIGS. 25 and 26. Before the barrier segment 110 is molded, the wire rope cables 46 are placed inside the mold tool. The cables are made with an eyelet or loop 48 (FIG. 30) at each end, and are placed in the mold so that the cable loops 48 wrap around the t-pin hole 124 outside diameter as shown in FIG. 27. Preferably, the wire rope cables 46 are each comprised of stainless steel, or galvanized and stranded steel wire cable to resist corrosion due to their contact with the water ballast, and are preferably formed of ⅜ inch 7×19 strands, though alternative suitable cable strands may be used as well. By placing the cables 46 around the t-pin holes 124, dual fence posts are created on each side of the barrier segment 110, with four cable lines 46 disposed in between, thereby forming an impenetrable cable fence in addition to the water ballast. It is noted that the wire cable loop ends are completely covered in plastic during the rotational molding process, to prevent water leakage.

By placing the wire rope cable 46 and wrapping it around the t-pin hole 124, a high strength area in the interlocking knuckles is created. When the t-pin 126 is dropped into the hole 124, to connect a series of barrier fence segments 110, it automatically becomes a steel post by default, since the wire rope cable segments 46 are already molded into the barrier segments. Since the loop of each cable end wraps around the t-pin in each knuckle, the impacting vehicle will have to break the wire rope cable 46, t-pin 126, and knuckle in order to penetrate the barrier. FIGS. 28-30 illustrate how the wire rope cables 46 wrap the T-pin holes 124.

The wire rope cables 46 are an integral part of each barrier segment 110, and cannot be inadvertently omitted or removed once the part has been manufactured. The current design uses up to five wire rope cables 46 per barrier segment 110, as illustrated. This creates a ten piece interlocking knuckle section. More or fewer knuckles and wire rope cables may be utilized, depending upon whether a lower or taller barrier is desired. The wire rope fence construction disclosed in connection with this second TL-2 or TL-3 embodiment can also be incorporated into the lower height barrier illustrated and described in FIGS. 1-17. When large numbers of barrier segments are used to create a longitudinal barrier, a wire rope cable fence is formed, with a t-pin post, with the whole assembly being ballasted by water without seeing the cable fencing. FIG. 31 illustrates such a plurality of segments 110, interlocked together to form a barrier as just described. As illustrated, each barrier segment is approximately 2100 lb when filled with water.

As the barrier illustrated in FIG. 31 is impacted by a vehicle, the plastic begins to deform and break, water ballast is displaced, and water is dispersed while the wire rope cables 46 continue the work of absorbing the impact energy by pulling along the knuckles and pulling the series of wire rope cables in tension. The entire area of impact immediately becomes a wire rope cable fence in tension, holding the impacting vehicle on one side of the water ballasted barrier.

Figure 32:
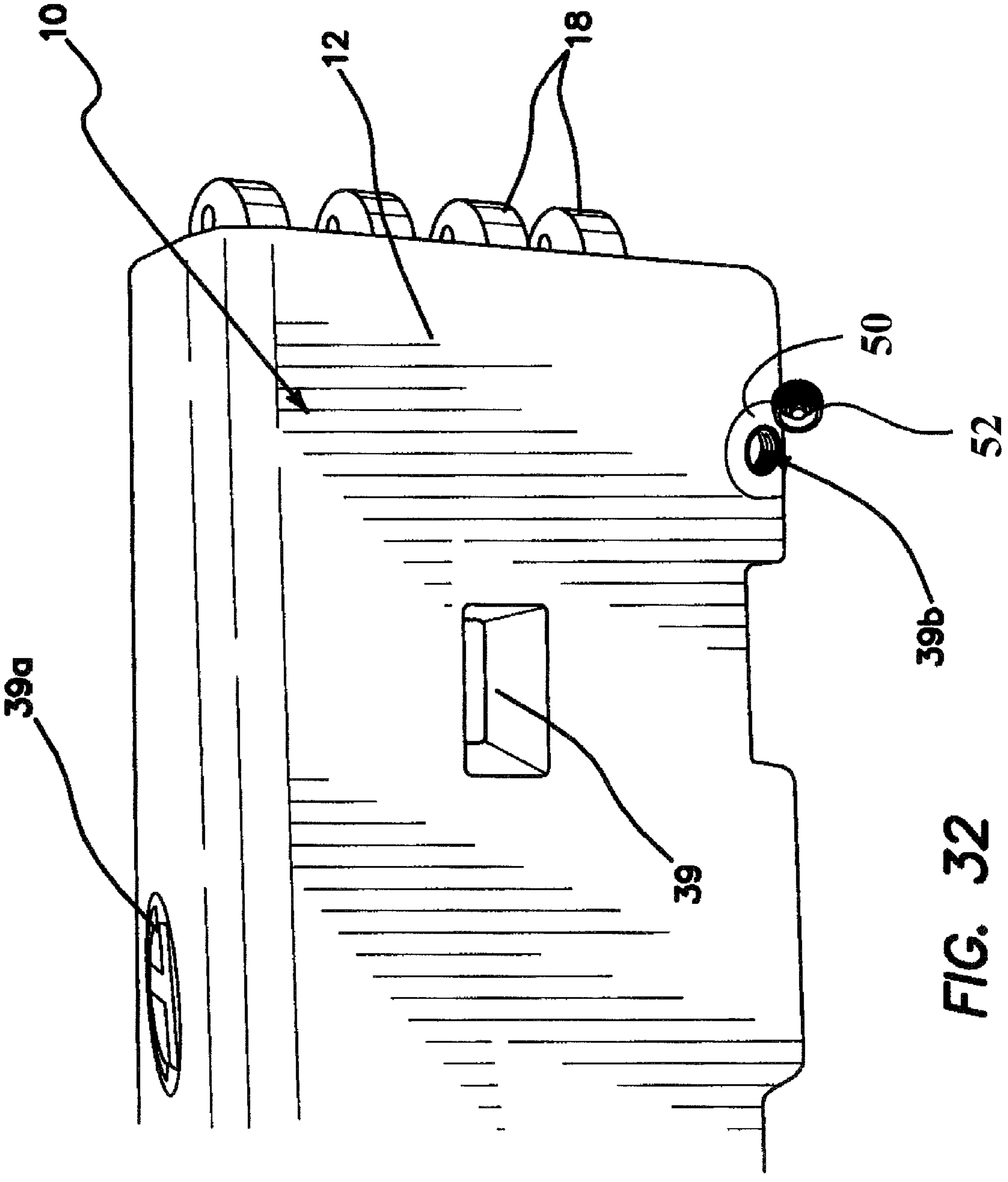
FIG. 32 is a front elevation view of a barrier segment constructed in accordance with the principles of the invention, in which is disposed a drain aperture having an inventive buttress thread configuration.
Figure 33:
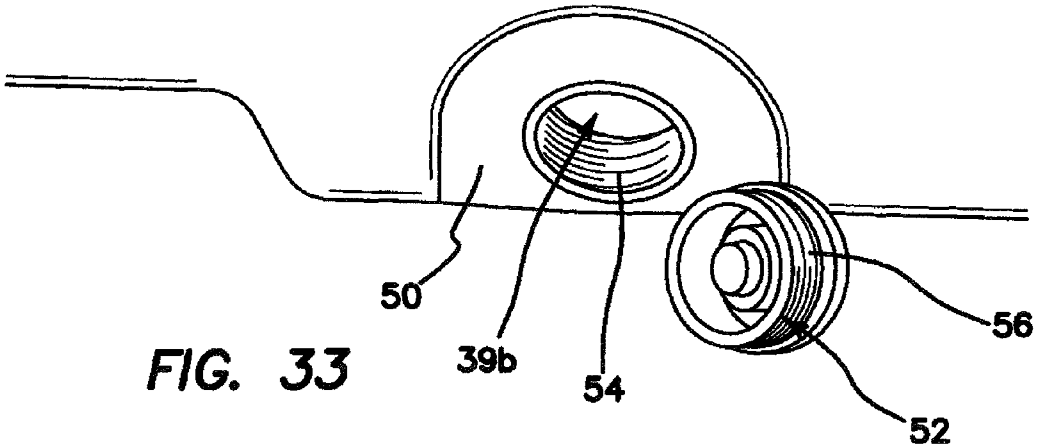
FIG. 33 is an enlarged view of the drain aperture of FIG. 32.
Figure 34:
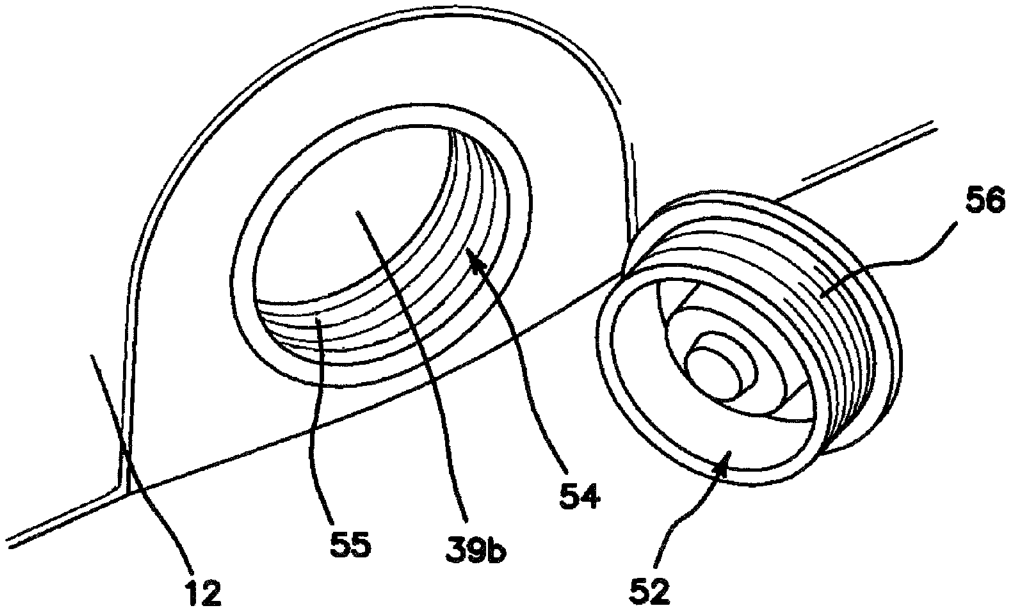
FIG. 34 is an enlarged perspective view of the drain aperture of FIG. 32.
Figure 37:
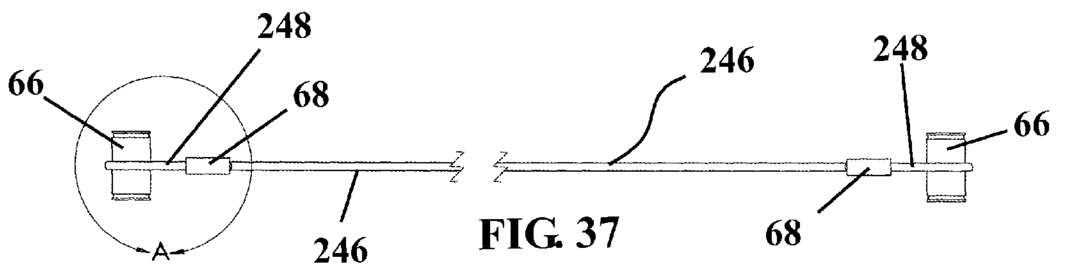
FIG. 37 is a plan view illustrating the construction of a presently preferred configuration for the wire rope assembly of the present invention, in isolation.

With reference particularly to FIGS. 32-34, an inventive embodiment of the drain aperture **39*b* will be more particularly described. This particular feature is applicable to any of the above described embodiments of the invention. The aperture 39*b* is disposed within a recess 50 in a bottom portion of the barrier segment 10. A closure or cap 52 is provided for closing and sealing the aperture 39*b* to prevent leakage of ballast from the barrier segment 10. The closure 52 is secured in place by means of a series of buttress threads 54 (FIGS. 33, 34). The buttress threads 54 are coarse and square cut, with flat edges 55, and advantageously function to create a hydraulic seal through the interference fit between the threads 54 on the aperture 39*b* and mating threads 56 on the closure 52**.

The closure 52 comprises, in the preferred embodiment, a plastic plug which is threaded into the barrier segment outer wall 12 by means of the interengaging buttress threads 54, 56, as described above. A sealing washer on the plug 52 sits, in a flat profile, on the sealing surface on the barrier wall 12 once the threads are engaged. This flat profile results in a lower chance of leakage, with no need to over-tighten the plug 52. Advantageously, the unique design results in a much reduced chance of cross-threading the plug when threading it into the wall, compared with prior art approaches, and it is much easier to start the thread of the plug into the barrier wall.

Because of the recess 50, the plug 52 is flush or even recessed relative to the wall, which reduces the chances of damage to the plug during use.

The thread 54 is uniquely cast-molded into the wall, which is typically roto-molded. Avoidance of spin-welding, which is a typical prior art technique for fabricating threads of this type in a roto-molded device, surprisingly greatly reduces the chance of damage to the barrier and closure due to cracking and stripping.

Referring now to FIGS. 35-41, yet another modified embodiment of the present invention is illustrated, wherein like elements to those in the previous embodiments are designated by like reference numerals, preceded by the numeral 2. Thus, in FIGS. 35 and 36 a barrier segment 210 is shown, which is similar in many respects to barrier segment 110, but differs in ways that will be described herein. The barrier segment 210 comprises forklift and pallet jack lift points 239 disposed on a bottom edge of the segment, as well as a second set of forklift lift points 239 disposed above the first set. A drain aperture 239*b* is disposed between the two lower lift points 239. The drain aperture preferably employs the cap and buttress thread features illustrated and described in connection with FIGS. 32-34. A fill aperture 239*a* is disposed on a top surface of the segment, having a diameter, in one preferred embodiment, of approximately 8 inches. Advantageously, the fill aperture also comprises a lid 58, which is molded with fittings designed to ensure water-tight securement with an easy ¼ turn of the lid. As illustrated, each barrier segment weighs approximately 160 lb when empty, and approximately 2000 lb when filled with approximately 220 gallons of water. The segment 210 is approximately 72 inches in length (excluding the lugs), 46 inches in height, and 25 inches wide.

In the illustrated embodiment, the right side of each barrier segment 210 preferably includes five lugs 218, while the left side comprises six lugs 218. These lugs are configured to be interleaved when two adjacent barrier segments 210 are joined, as in the prior embodiments, so that the pin receiving holes 224 are aligned for receiving a T-pin 226. The T-pin 226 comprises a T-pin handle 60 at its upper end, and a keeper pin 62 insertable through a hole in its lower end, as illustrated in FIG. 36. To join the barrier segments 210 together, the T-pin 226 is inserted downwardly through all of the aligned holes 224. Then, the keeper pin 62 is inserted through the hole in the lower end of the pin 226, to ensure that the T-pin cannot be inadvertently removed. In a preferred embodiment, the diameter of the T-pin is approximately 1¼".

Figure 42:
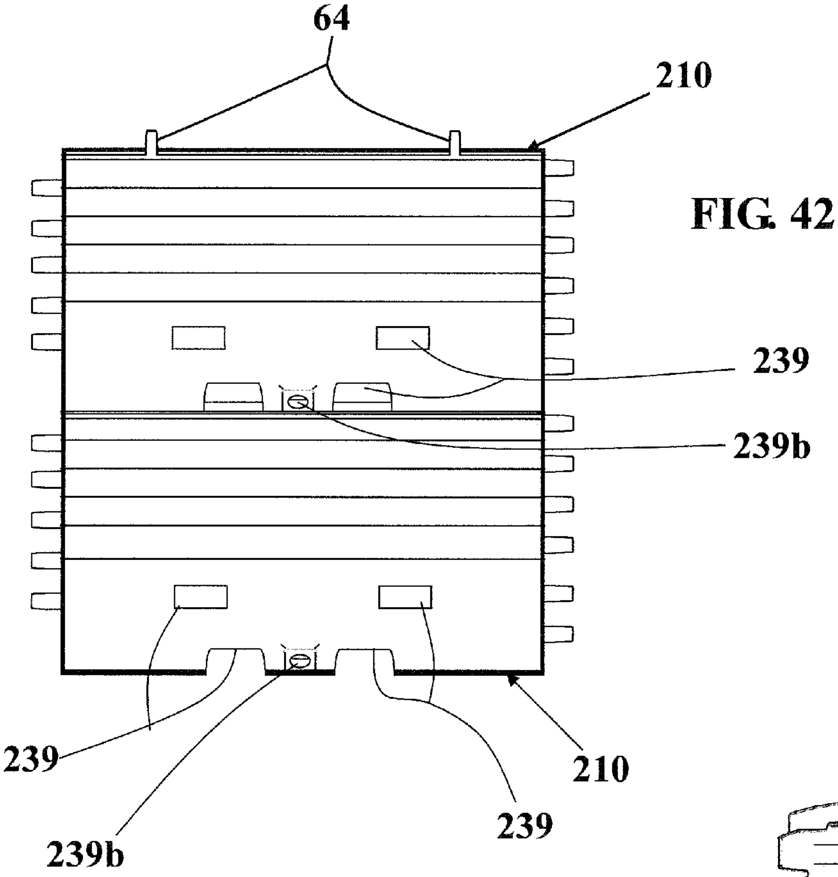
FIG. 42 is a plan view illustrating two of the barrier segments of the present invention in a vertically stacked configuration.
Figure 43:
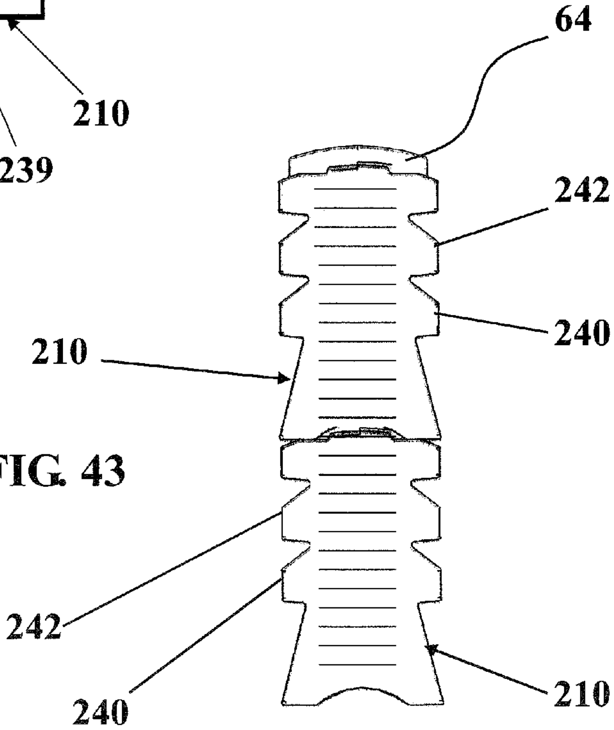
FIG. 43 is an end view of the stacked array of FIG. 42.

Stacking lugs 64 are disposed on the top surface of each barrier segment, and corresponding molded recesses 65 are disposed in the lower surface of the barrier segment 210. Thus, as shown in FIGS. 42 and 43, the barrier segments 210 may be stacked vertically, with the stacking lugs 64 on the lower barrier segment 210 engaging with their counterpart stacking recesses 65 on the upper barrier segment 210. Two barrier segments, stacked vertically, have a total height of approximately 87 inches, in one preferred embodiment.

One significant difference between the embodiment of FIGS. 19-31 and the embodiment of FIGS. 35-41 is the particular design of the sawtooth segments 240, 242. As is evident from inspection of the various figures, the latter embodiment retains substantially flat barrier side walls, with recesses into which the sawtooth segments extend, in an upward slanting direction, as shown. The resulting anti-climb function is similar to that of the FIGS. 19-31 embodiment, but the manufacturing process is greatly simplified. In one preferred embodiment, the angle of slant of each sawtooth segment is approximate 43 degrees.

Now, with reference particularly to FIGS. 37-41, details of the innovative wire rope cable system are illustrated. In this embodiment, an insertion sleeve or bushing 66 is molded into each lug or knuckle 218. The bushing 66 is preferably cylindrical, and its interior diameter comprises the pin receiving hole 224 of the corresponding knuckle 218 in which the bushing is molded. The bushing 66 is preferably comprised of steel, though other suitable materials may be employed. As in prior embodiments, the wire rope cables preferably comprise ⅜ inch 7×19 galvanized steel cable, though other suitable materials may also be utilized. Because of the advantageous molding techniques of the present invention, which causes the cables 246 to be completely encapsulated in molded plastic, stainless steel need not be used. The inventors have found that braided carbon steel is stronger. Both the bushing 66 and the cable 246 is preferably hot-dipped galvanized.

Figure 38:
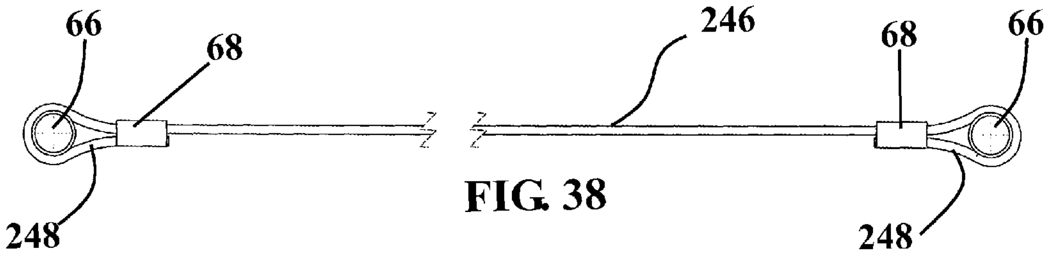
FIG. 38 is a top view of the assembly illustrated in FIG. 37.
Figure 39:
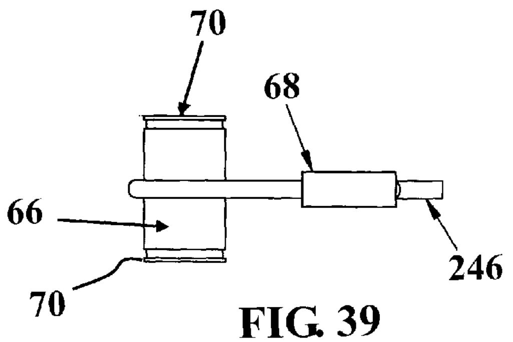
FIG. 39 is an enlarged view of the portion of FIG. 37 denoted by the circle A.
Figure 40:
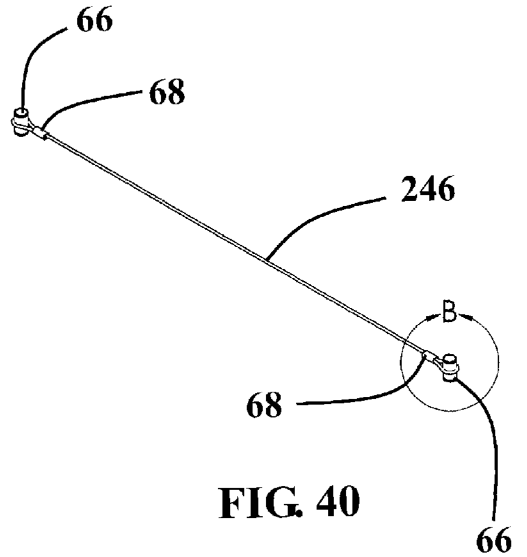
FIG. 40 is an isometric view of the assembly illustrated in FIGS. 37 and 38.
Figure 41:
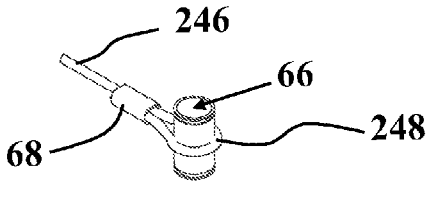
FIG. 41 is an enlarged isometric view of the portion of FIG. 40 denoted by the circle B.

Each end of the steel cable 246 is extended around the bushing 66 to form eyelet or loop 248, and secured to the remaining cable 246 by a swage or clamp 68. The bushing 66 is sized to allow it to be inserted into the mold prior to molding. The assembly illustrated in FIG. 38 is then placed in the barrier segment mold (not shown), together with the other similar assemblies, preferably four, as shown in FIG. 36, so that corresponding knuckles 218 on each side of the barrier are tied together by a wire rope cable assembly 246. The cables are relatively taut when placed into the mold. When the rotational molding process is completed, including the cooling of the barrier segment, the cables become slack. The amount of slack contributes to the effectiveness of the bushing-cable assembly during an impact by allowing the plastic and the water to absorb some of the impact energy before the cables are engaged. The bushing and a portion of the cable become encapsulated in plastic as a result of the molding process, forming an integrally molded-in, leak-proof connection.

In a preferred configuration, the bushing 66 comprises steps 70 at the top and bottom ends thereof. The bushing 66 is approximately 3⅛" in length, with a 1½" ID and a 1¾" OD. The steps 70 are preferably approximately 0.095 inches, and serve to create an edge for plastic to form an extra thick layer around the top and bottom sections of the bushing during the molding process. By creating the thicker plastic layer in these portions, the sleeve edge design inherently prevents water from leaking at these top and bottom edges. This thicker plastic layer prevents water seepage from occurring between the steel and plastic mating surfaces. The entire assembly of a wire rope cable 246 and, on each end, a clamped loop 248 and bushing 66 is approximately 77½" in length when taut, from the center of one bushing to the center of the other.

An actual vehicular impact produces the following energy absorbing actions:

1. One or more of the high density polyethylene (HDPE) barrier segments which are impacted burst;

2. The water in each burst section is released and dispersed over a wide area;

3. The cables 246 are engaged and prevent breaching or climbing of the barrier;

4. Many segments 210 of the barrier remain assembled together, but are moved during the impact. They are either dragged closer to the point of impact if they are in tension, or pushed away if they are in compression.

It should be noted that relatively few barrier segments 210 will burst, depending upon the severity of the impact. Many segments will move and will be undamaged or have minor leaks which are readily repaired.

The bushing 66 serves several advantageous purposes. First, it is a significant contributor to a process that is easier to manufacture and produces no leaks when the barrier segment 210 is completed during the molding process. Also, during impact, the bushing spreads the impact load that is transmitted from the steel cables 246 to the knuckles 218, and the load is further transferred to the connecting pin 226. This ensures that the assembled barrier, comprised of a plurality of segments which are joined together, as shown in FIGS. 7, 8, 12, 13, 18, and 31, for example, will not be breached during an impact. Moreover, the location of the cables 246 prevents a vehicle from climbing over the wall during an impact. Crash tests conducted on the inventive barrier system demonstrate that the displacement of barrier walls formed of assembled barrier segments 210, upon vehicular impact, are displaced significantly less than is the case with competing prior art products. This is a considerable advantage, in that clear space behind the barrier can be substantially less, meaning that less of a roadway requires closure.

Another modified embodiment of the inventive concept may comprise barrier segments 210, molded in 3 foot lengths, with lug connections and cables, as shown and discussed above, for the purpose of functioning as a barricade end treatment. In this embodiment, the T-pins 226 extend downwardly through the connection lugs 218 and bushings 66, to ground. Such a device comprises a non-gating device, because, with the cable connections, a vehicle cannot get through it. This embodiment may comprise a cast "New Jersey" barrier wall, wherein one end is squared off. In this embodiment, female sockets are molded internally on the squared-off end, and sized the same as the male lugs on the other end, so that they fit together for reception of a drop or T-pin. This embodiment results in a flush connection between two adjoining barricade segments 210, which means there is no surface interruption and no relative rotation between those barrier segments. As noted above, the T-pin extends to ground, and into a hole drilled into the ground, so that there is no wall translation, thus creating the non-gating barrier.

It is noted that there is no requirement that the barrier segment 210 be ballasted with water. Alternative ballasts, particularly if dispersible, may be utilized. It is also within the scope of the invention, particularly if a particular segment 210 is to be used as an end treatment, to fill the segment with foam. The foam would be installed during the manufacturing process, and the fill and drain apertures could be eliminated. The cables 246 would still be used.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A barrier segment which is hollow and adapted to be filled with a fluent material for ballast, comprising:

a molded plastic container having outer side walls defining an interior volume and having a first end and a second end;

a plurality of connecting lugs disposed on each of said first and second ends, so that a plurality of barrier segments may be joined together;

a length of metallic cable molded within said molded plastic container, so that most of the length of metallic cable is entirely disposed within said interior volume, along substantially an entire length of said container between said first and second ends; and a metallic bushing insert molded into one of said connecting lugs on the first end of the barrier segment to form a channel through which a pin can be extended to secure the lug to another lug, wherein an end of said metallic cable is attached to said metallic bushing, said metallic bushing comprising an enlarged step at each end thereof and being encapsulated in molded plastic, to form an integrally molded-in, leak-proof connection.

2. The barrier segment as recited in claim 1, wherein said metallic cable comprises wire rope cable.

3. The barrier segment as recited in claim 2, wherein said wire rope cable comprises a plurality of strands.

4. The barrier segment as recited in claim 1, wherein said metallic cable comprises galvanized steel.

5. The barrier segment as recited in claim 1, wherein a second end of said length of metallic cable is connected to a second metallic bushing insert molded into a connecting lug disposed on the second end of the barrier segment.

6. The barrier segment as recited in claim 1, and further comprising additional lengths of metallic cable, wherein there is a length of metallic cable connected between each pair of opposing lugs on the first and second ends of the container.

7. The barrier segment as recited in claim 1, wherein the end of the cable is wrapped about a periphery of the metallic bushing and connected to the cable to form a loop of cable securing the cable to the bushing.

8. The barrier segment as recited in claim 7, wherein the end of the cable is clamped to the remaining cable to secure the loop of cable in place about the metallic bushing.

9. The barrier segment as recited in claim 1, wherein the molded plastic encapsulating the bushing is thicker around each of said enlarged steps than around remaining portions of the metallic bushing.

10. The barrier segment as recited in claim 1, wherein the metallic cable is completely encapsulated in molded plastic, so that ballast within said interior volume does not contact the metallic cable.

11. The barrier segment as recited in claim 1, said outer walls having a plurality of sawtooth segments disposed thereon, which are arranged in spaced relation vertically and extend inwardly and upwardly in order to deflect vehicles impacting the barrier segment in a downward direction.

12. The barrier segment as recited in claim 1, said outer walls having a plurality of sawtooth segments disposed thereon, which are arranged in spaced relation vertically, said plurality of connecting lugs each comprising a radiused edge and extending substantially across an entire width of each of said first and second ends, so that the radiused edge of each connecting lug blends into each of said outer side walls, and wherein said plurality of sawtooth segments are each shorter than a full length of said barrier segment so that there is space on each end of each outer side wall to accommodate the blended radiused edges of each connecting lug.

13. The barrier segment as recited in claim 1, wherein said length of metallic cable is slack prior to impact of a vehicle with said barrier segment.

14. The barrier segment as recited in claim 1, and further comprising:

a plurality of stacking lugs disposed in spaced relation on a top surface of said barrier segment; and a corresponding plurality of stacking recesses disposed in spaced relation on a bottom surface of said barrier segment, wherein when two of said barrier segments are stacked vertically, the stacking lugs on the bottom barrier segment engage with the corresponding stacking recesses on the top barrier segment.

15. A method of making a barrier segment for use in creating a roadside barrier system, the method comprising:

disposing a plurality of wire rope cables, each of which are connected on an end thereof to a metallic bushing, within a mold tool; and using the mold tool to mold a plastic hollow container, the molding step forming a layer of plastic encapsulating each bushing and the end of each respective wire rope cable connected thereto to form an integrally molded-in, leak-tight connection, and further forming a layer of plastic encapsulating each length of wire rope cable so that they cannot be in direct contact with surrounding ballasting material within the plastic hollow container; such that, when the molding step is completed, the wire rope cable and bushing assemblies are irremovably disposed within said plastic hollow container.

16. The method as recited in claim 15, and further comprising a step of swaging the end of the wire rope cable to said metallic bushing, thereby forming a cable loop around a periphery thereof, and a further step of swaging an opposed end of the wire rope cable to a second metallic bushing, thereby connecting the second end to said second metallic bushing and forming a second cable loop around a periphery thereof.

* * * * *